(12) United States Patent
Bartos et al.

(10) Patent No.: US 11,201,877 B2
(45) Date of Patent: Dec. 14, 2021

(54) DETECTING ENCRYPTED MALWARE WITH SPLT-BASED DEEP NETWORKS

(71) Applicant: Cisco Technology, Inc., San Jose, CA (US)

(72) Inventors: Karel Bartos, Prague (CZ); Martin Vejman, Litomysl (CZ)

(73) Assignee: Cisco Technology, Inc., San Jose, CA (US)

(*) Notice: Subject to any disclaimer, the term of this patent is extended or adjusted under 35 U.S.C. 154(b) by 323 days.

(21) Appl. No.: 16/216,361

(22) Filed: Dec. 11, 2018

(65) Prior Publication Data
US 2020/0186547 A1 Jun. 11, 2020

(51) Int. Cl.
*H04L 29/06* (2006.01)
*G06N 3/04* (2006.01)
*G06N 3/08* (2006.01)

(52) U.S. Cl.
CPC .......... *H04L 63/1416* (2013.01); *G06N 3/04* (2013.01); *G06N 3/08* (2013.01); *H04L 63/145* (2013.01); *H04L 63/1458* (2013.01); *H04L 63/166* (2013.01)

(58) Field of Classification Search
CPC .............. H04L 63/1416; H04L 63/145; H04L 63/1458; H04L 63/166; H04L 63/1408; G06N 3/04; G06N 3/08; G06N 20/00
See application file for complete search history.

(56) References Cited

U.S. PATENT DOCUMENTS

| 9,038,172 | B2 | 5/2015 | Miller et al. |
| 9,729,571 | B1 | 8/2017 | Ferguson et al. |
| 10,805,338 | B2 * | 10/2020 | Kohout ............... H04L 41/0686 |

(Continued)

FOREIGN PATENT DOCUMENTS

CN 107483458 A * 12/2017

OTHER PUBLICATIONS

Blake Anderson, "Identifying Encrypted Malware Traffic with Contextual Flow Data", AISec'16, Oct. 28, 2016, Vienna, Austria, 12 pages (Year: 2016).*

(Continued)

*Primary Examiner* — Peter C Shaw
*Assistant Examiner* — Han Yang
(74) *Attorney, Agent, or Firm* — Behmke Innovation Group; Kenneth J. Heywood; Jonathon P. Western

(57) ABSTRACT

In one embodiment, a device obtains telemetry data for a plurality of encrypted traffic flows observed in a network. The device clusters the flows into observed flow clusters, based on one or more flow-level features of the obtained telemetry data, as well as malware-related traffic telemetry data into malware-related flow clusters. The observed and malware-related telemetry data are indicative of sequence of packet lengths and times (SPLT) information for the traffic flows. The device samples sets of flows from the observed and malware-related flow clusters, with each set including at least one flow from an observed flow cluster and at least one flow from a malware-related flow cluster. The device trains a deep learning neural network to determine whether a particular encrypted traffic flow is malware-related, by using the SPLT information for the sampled sets of traffic flows as input to an input layer of neurons of the deep network.

20 Claims, 7 Drawing Sheets

(56) References Cited

U.S. PATENT DOCUMENTS

| | | | |
|---|---|---|---|
| 2006/0106797 A1* | 5/2006 | Srinivasa | G06F 16/2465 |
| 2016/0352761 A1* | 12/2016 | McGrew | H04L 63/1408 |
| 2016/0359680 A1 | 12/2016 | Parandehgheibi et al. | |
| 2017/0220929 A1* | 8/2017 | Rozen | G06N 3/04 |
| 2017/0228658 A1* | 8/2017 | Lim | G06N 20/00 |
| 2020/0236131 A1* | 7/2020 | Vejman | G06N 3/0445 |
| 2021/0044572 A1* | 2/2021 | Liu | H04L 47/2441 |

OTHER PUBLICATIONS

Cisco white paper, "Cisco Encrypted Traffic Analytics", 2019, 10 pages (Year: 2019).*

David McGrew, "Enhanced Telemetry for Encrypted Threat Analytics", 2016 IEEE 24th International Conference on Network Protocols (ICNP) Workshop on Machine Learning in Computer Networks (NetworkML 2016), 6 pages (Year: 2016).*

Shahbaz Rezaei, "Deep Learning for Encrypted Traffic Classification: An Overview", https://arxiv.org/pdf/1810.07906v1.pdf, Oct. 2018, 8 pages (Year: 2018).*

Paraskevi Dimou, "Encrypted Traffic Analysis", Nov. 2019, European Union Agency for Cybersecurity (ENISA), 55 pages (Year: 2019).*

Blake Anderson, "Deciphering malware's use of TLS (without decryption)", Aug. 31, 2017, J Comput Virol Hack Tech (2018) 14: 195-211, https://doi.org/10.1007/s11416-017-0306-6, 17 pages (Year: 2017).*

Alshammari, et al., "Can encrypted traffic be identified without port numbers, IP addresses and payload inspection?", Computer Networks, vol. 55, Issue 6, Apr. 25, 2011, pp. 1326-1350, Elsevier B.V.

Anderson, Blake., "Detecting Encrypted Malware Traffic (Without Decryption)", https://blogs.cisco.com/security/detecting-encrypted-malware-traffic-without-decryption, Cisco Blog—Security, 12 pages, Jun. 23, 2017, Cisco.

Prasse, et al., "Malware Detection by Analysing Network Traffic with Neural Networks", 2017 IEEE Security and Privacy Workshops (SPW), San Jose, CA, 2017, pp. 205-210, IEEE.

Wang, Yu., "Automatic Network Traffic Classification", Submitted in fulfilment of the requirements for the degree of Doctor of Philosophy, 187 pages, May 2013, Deakin University.

* cited by examiner

DETECTING ENCRYPTED MALWARE WITH SPLT-BASED DEEP NETWORKS

TECHNICAL FIELD

The present disclosure relates generally to computer networks, and, more particularly, to detecting encrypted malware with sequence of packet lengths and times (SPLT)-based deep networks.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to exfiltrate sensitive information from a network, such as credit card numbers, trade secrets, and the like. Further types of malicious network traffic include network traffic that propagate the malware itself and network traffic that passes control commands to already infected devices, such as in the case of a distributed denial of service (DDoS) attack.

Inspection of network traffic is relatively straight-forward, when the network traffic is unencrypted. For example, techniques such as deep packet inspection (DPI), allows a networking device to inspect the payloads of packets and identify the contents of the packets. However, the use of traffic encryption is becoming increasingly ubiquitous, making techniques such as DPI unable to identify threats and prevent sensitive data from being communicated elsewhere.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
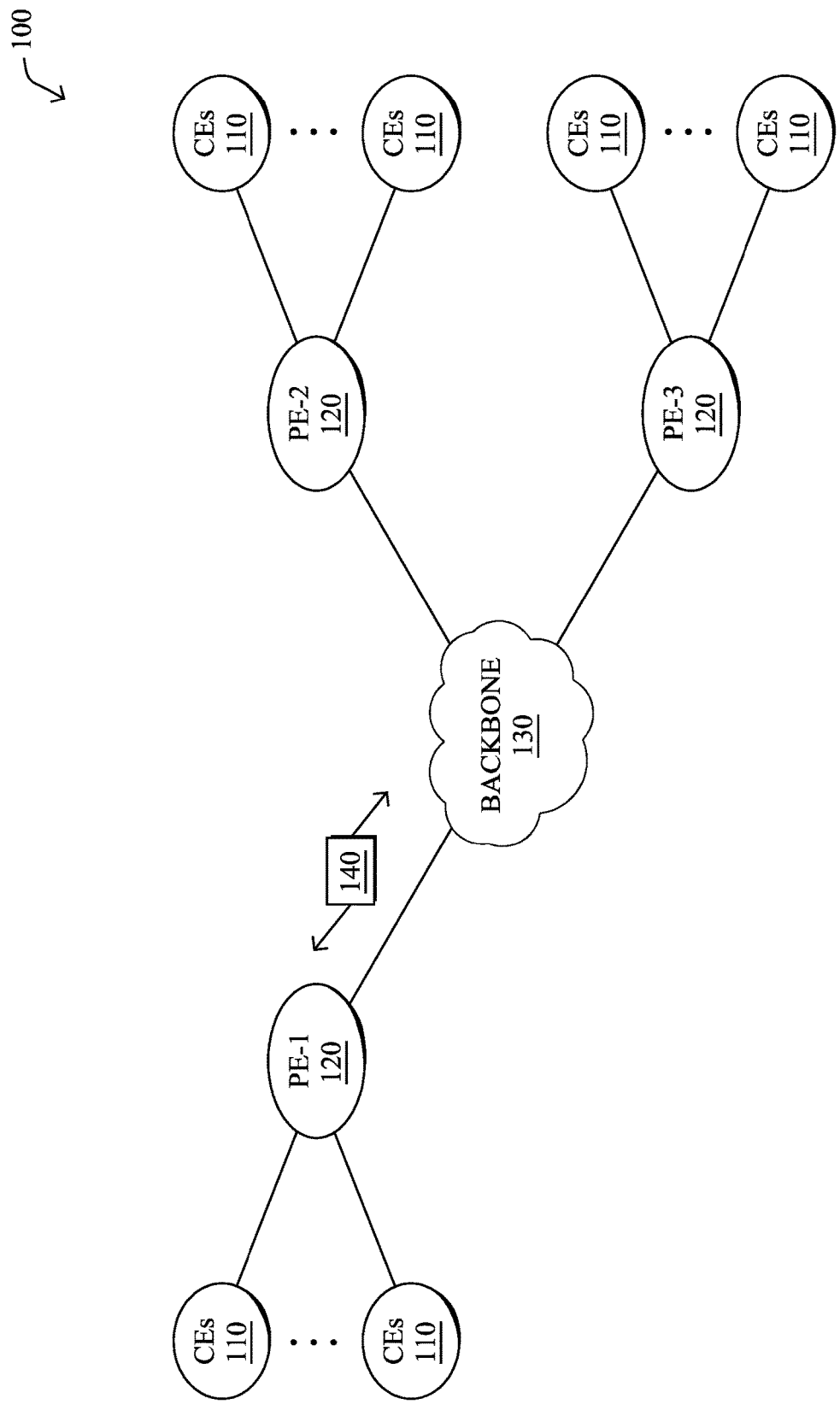
FIGS. 1A-1B illustrate an example communication network.

According to one or more embodiments of the disclosure, a device obtains traffic telemetry data for a plurality of encrypted traffic flows observed in a network. The device clusters the encrypted traffic flows into observed flow clusters, based on one or more flow-level features of the obtained traffic telemetry data. The device also clusters, based on the one or more flow-level features, malware-related traffic telemetry data for encrypted traffic flows known to be malware-related into malware-related flow clusters. The observed and malware-related telemetry data are indicative of sequence of packet lengths and times (SPLT) information for the observed traffic flows. The device samples sets of traffic flows from the observed flow clusters and from the malware-related flow clusters, with each set of traffic flows including at least one traffic flow from an observed flow cluster and at least one traffic flow from a malware-related flow cluster. The device trains a deep learning neural network to determine whether a particular encrypted traffic flow is malware-related, by using the SPLT information for the sampled sets of traffic flows as input to an input layer of neurons of the deep learning neural network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
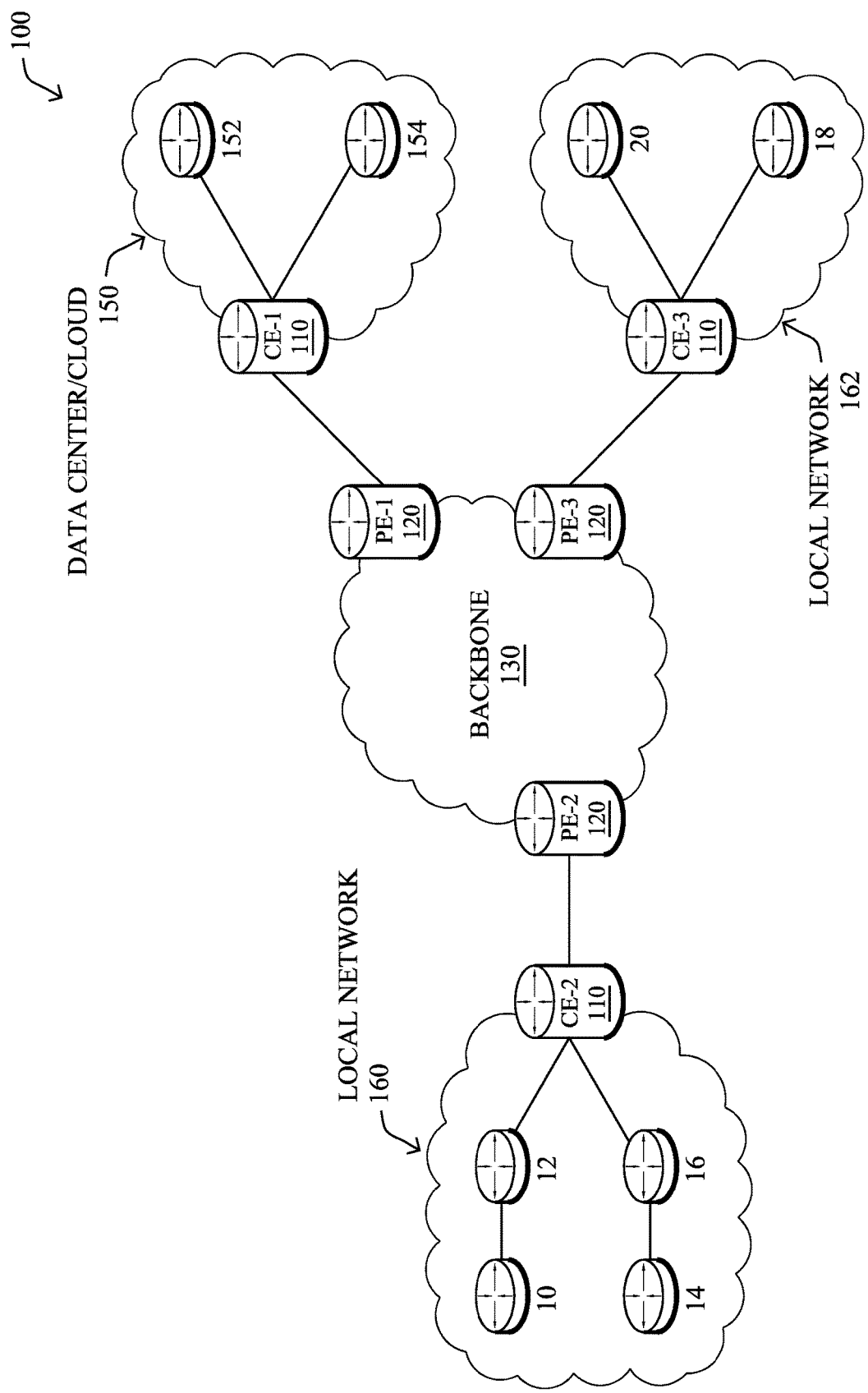

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
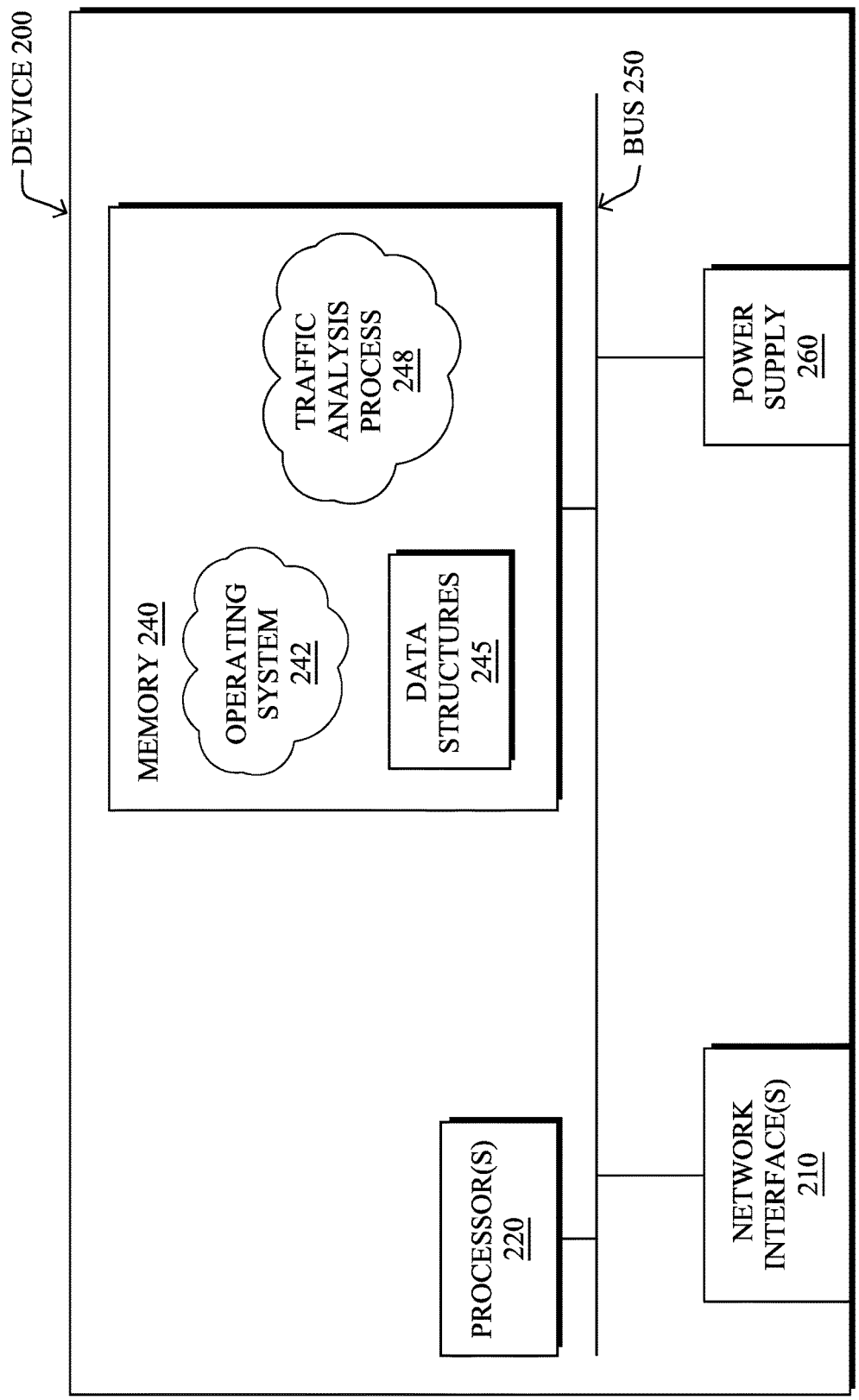
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis process 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
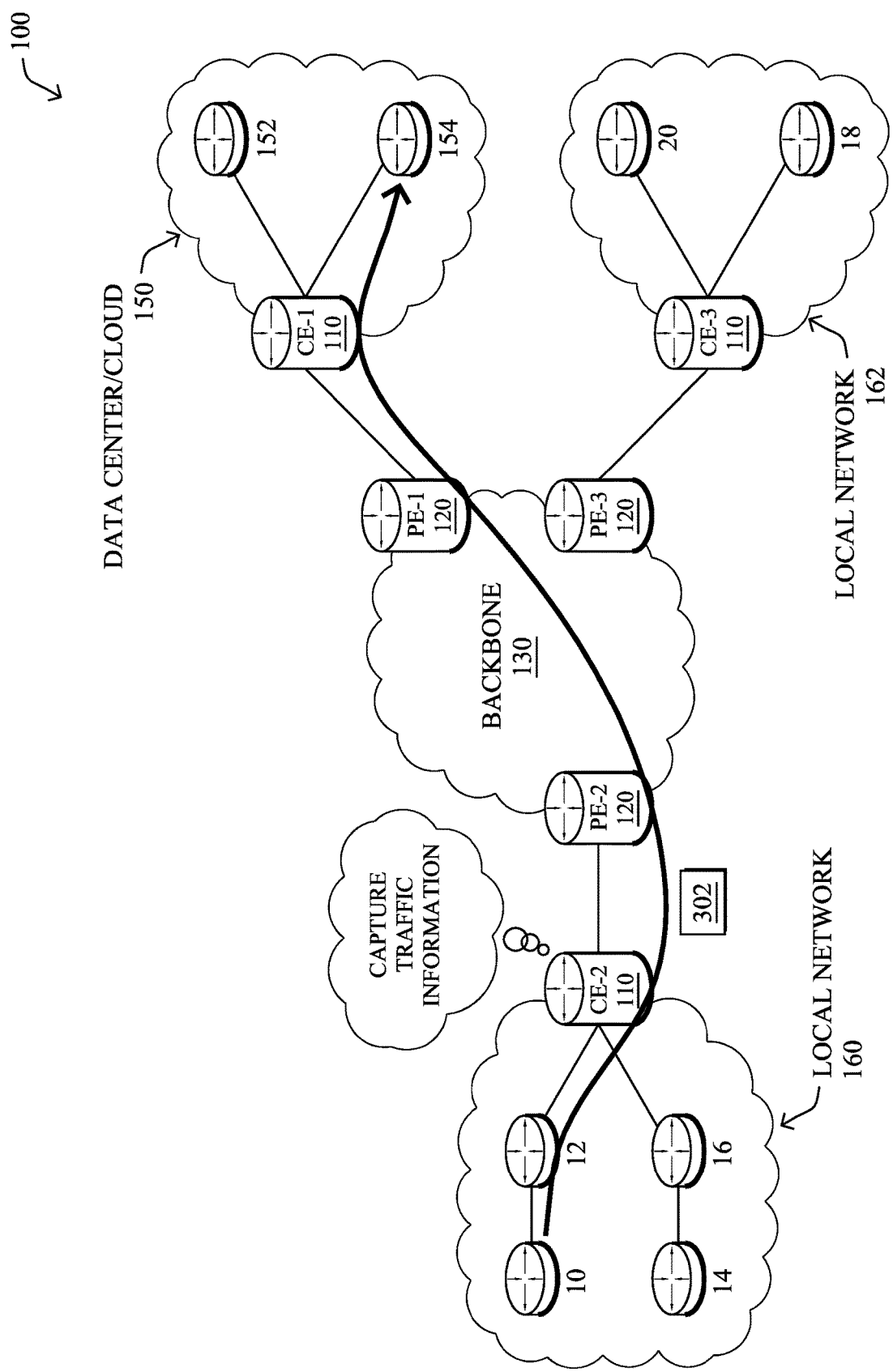
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, malware is increasingly using traffic encryption to avoid detection at the network level. Some approaches to deal with this entail using a proxy/man-in-the-middle inserted into the communication pathway between an endpoint and a server. In doing so, the proxy is able to decrypt the traffic flows and apply DPI and/or other packet analysis approaches to the traffic, to determine whether the traffic is indicative of a malware infection. While this approach can be somewhat effective, it also necessitates the decryption of traffic that was otherwise intended to be sent securely. This may itself be a security risk (e.g., by exposing the message data), may be wholly undesirable from a user or policy standpoint, and may even be illegal, in some jurisdictions. Thus, man-in-the-middle approaches are not suitable in a wide variety of network deployments.

While some experts in the field of network security have recently suggested using SPLT data for purposes of analyzing encrypted traffic flows, existing approaches focus on the following:

Using basic statistical features of captured SPLT information, such as the mean or variance. Such features are good for basic classification problems, but have limited descriptive value for harder tasks (e.g., for detecting malware from encrypted traffic). In contrast, the techniques herein propose using raw SPLT information, as opposed to aggregated statistics, to learn the features automatically.

Manually defining the model features. However, since the features are highly complex and reflect all training data, it is not possible to define them by hand.

Detecting Encrypted Malware with SPLT-Based Deep Networks

The techniques herein allow for the detection of malware from encrypted traffic flows using captured SPLT information for the flows that does not require hand-made feature values. In some aspects, the techniques herein transform the raw SPLT information into histogram representations that is used as input for a deep learning neural network classifier. The neural network is trained to distinguish between classes which are defined by initial clustering of the traffic flows. In further aspects, the techniques herein also allow for classifier training by leveraging large amounts of unlabeled data, as labels are typically not available.

Specifically, according to one or more embodiments of the disclosure as described in detail below, a device obtains traffic telemetry data for a plurality of encrypted traffic flows observed in a network. The device clusters the encrypted traffic flows into observed flow clusters, based on one or more flow-level features of the obtained traffic telemetry data. The device also clusters, based on the one or more flow-level features, malware-related traffic telemetry data for encrypted traffic flows known to be malware-related into malware-related flow clusters. The observed and malware-related telemetry data are indicative of sequence of packet lengths and times (SPLT) information for the observed traffic flows. The device samples sets of traffic flows from the observed flow clusters and from the malware-related flow clusters, with each set of traffic flows including at least one traffic flow from an observed flow cluster and at least one traffic flow from a malware-related flow cluster. The device trains a deep learning neural network to determine whether a particular encrypted traffic flow is malware-related, by using the SPLT information for the sampled sets of traffic flows as input to an input layer of neurons of the deep learning neural network.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 4:
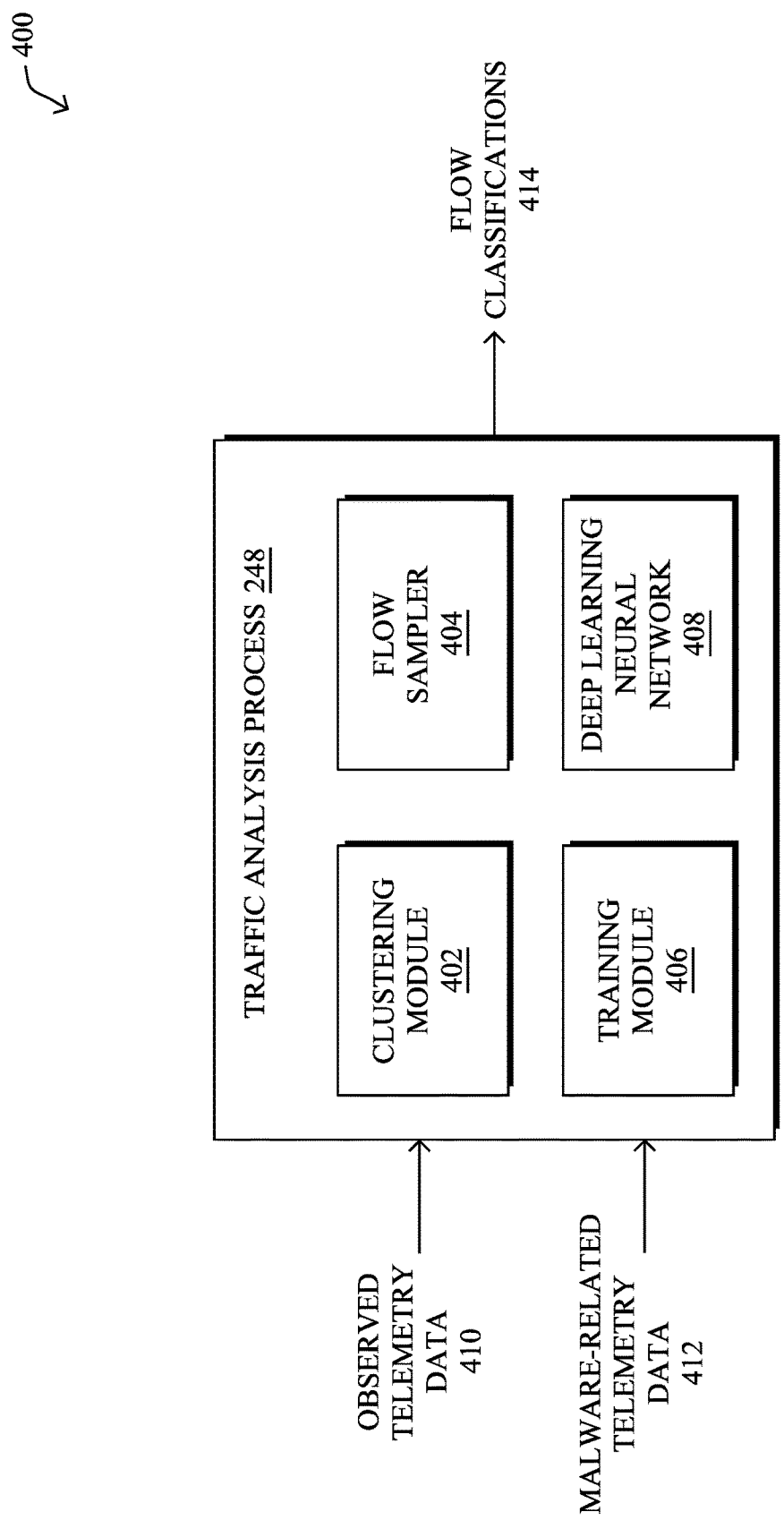
FIG. 4 illustrates an example architecture for training a deep learning neural network to identify malware-related encrypted traffic flows.

Operationally, FIG. 4 illustrates an example architecture 400 for training a deep learning neural network to identify malware-related encrypted traffic flows. At the core of architecture 400 is traffic analysis process 248, which may comprise any or all of the following components: a clustering module 402, a flow sampler 404, a training module 406, and/or a deep learning neural network 408. These components 402-408 may be implemented in a distributed manner or implemented as their own stand-alone services, either as part of the local network under observation or as a remote service (e.g., a cloud-based traffic analysis/malware-detection service). In addition, the functionalities of the components 402-408 of architecture 400 may be combined, omitted, or implemented as part of other processes, as desired.

According to various embodiments, a key functionality of architecture 400 is to combine SPLT features, such as data length and/or timestamp, into a single representation, automatically. Architecture 400 also does so by leveraging large amounts of unlabeled traffic telemetry data for flows observed in the network(s) and optimizing the parameters of the representation for the classification task. More specifically, in various embodiments, architecture 400 may perform any or all of the following steps:

Clustering of unlabeled data—the clusters are used to automatically learn the parameters of the representation/model.

Transforming SPLT data length and timestamp into histograms—to create a single input feature vector for the deep learning neural network.

Learning/optimizing the parameters (weights) of the representation—this can be achieved by using sets, such as triplets of samples, from the clusters above.

Ultimately, the primary goal of architecture 400 is to detect encrypted malicious traffic with raw SPLT information and with no manually-defined features. The proposed approach takes advantage of the fact that the vast majority of data is unlabeled and performs clustering of data into classes based on the features that are available in the encrypted traffic. Then, a deep learning neural network is trained in such a way to leverage the unlabeled data, with only a few malicious examples per malware class.

The input data for traffic analysis process 248 includes the following:

Observed telemetry data 410—such telemetry data may include any information regarding any number of encrypted traffic flows observed in a network. For example, observed telemetry data 410 may be indicative of SPLT information, as well as other flow-level features such as, but not limited to, Server Name Indication (SNI) information, server IP address, server port, autonomous system, TLS or other protocol-related information, combinations thereof, or any other information that can be captured regarding.

Malware-related telemetry data 412—traffic analysis process 248 may also receive as input a much smaller set of telemetry data than that of telemetry data 410 for encrypted traffic flows known to be malware-related. Such information may be obtained, for example, by executing the malware in a sandbox environment, from security services in a live network, or the like. In general, malware-related telemetry data 412 may include the same captured information as that of observed telemetry data 410, such as SPLT information and other flow-level features.

In various embodiments, clustering module 402 may cluster the unlabeled traffic flows of observed telemetry data 410 into observed flow clusters, based on one or more of their flow-level features, with the feature(s) used for the clustering corresponding to a class of traffic flows. For example, clustering module 402 may cluster the flows from observed telemetry data 410 based on their SNI information, server IP addresses, autonomous system information, etc. In general, the purpose of this clustering is to break down large amounts of unlabeled traffic flows into smaller groups, with each group containing flows that have some common traffic features.

Similar to the clustering of traffic flows from observed telemetry data 410, clustering module 402 may also cluster the traffic flows from malware-related telemetry data 412 into their own clusters, based on one or more of their flow-level features. The malware-related flow clusters may be separate from that of the observed flow clusters. However, a malware-related flow cluster may also belong to the same class as that of one of the observed flow clusters, if they share the same flow-level feature(s) used for the clustering. For example, if both an observed flow cluster and a malware-related flow cluster share the same server IP address, they may be associated with one another as part of the same class of encrypted traffic flows. Note, however, that the unlabeled traffic flows in any given observed flow cluster may significantly outnumber those in the associated malware-related flow cluster of the same class.

Figure 5:
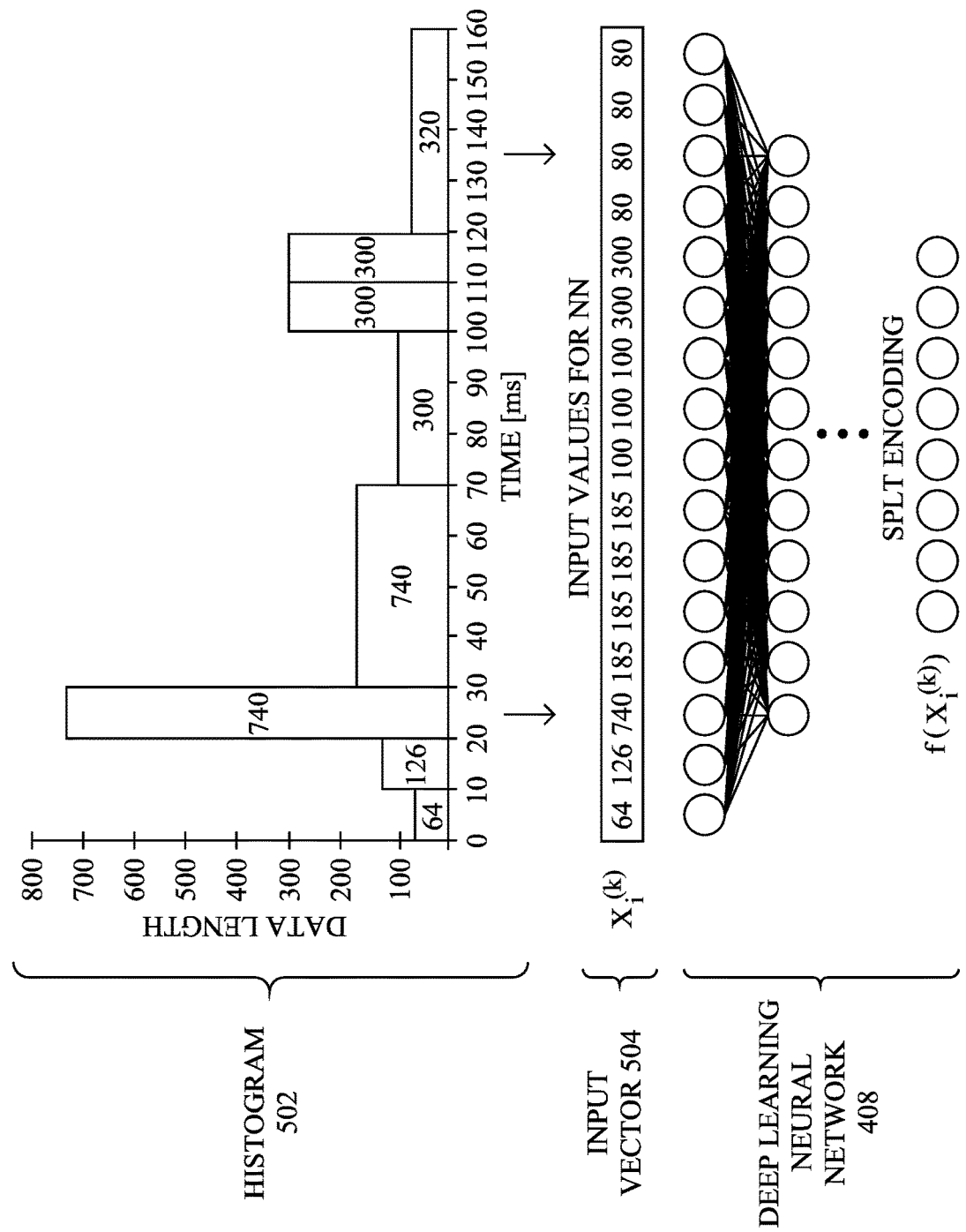
FIG. 5 illustrates the projecting of sequence of packet lengths and times (SPLT) information to an input vector for a deep learning neural network.

Before describing the training process for deep learning neural network 408, its neural network architecture must first be understood. FIG. 5 illustrates the projecting of sequence of packet lengths and times (SPLT) information to an input vector 504 for input to deep learning neural network 408. As would be appreciated, deep learning generally entails using a cascade of neuron layers, with each of the middle layers taking as input the output of the prior layer and performing feature extraction and data transformation on the data, in a non-linear manner. Each layer of processing of the network also corresponds to an increasing degree of abstraction.

As shown, deep learning neural network 408 may take as input (i.e., to its input layer), an input feature vector 504 comprising SPLT information. The output of deep learning neural network 408 is the final SPLT encoding f(x) of each flow.

In various embodiments, projecting of the SPLT information to the input layer of deep learning neural network 408 (e.g., formation of an input vector 504) may entail the formation of a histogram 502 using the raw SPLT information from the telemetry data. In such cases, there are essentially two parameters that can be tuned, to adjust the performance of deep learning neural network 408:

$T_w$=the size of the time window of a flow that is considered. For example, a value of $T_w$=100 may signify that the system extracts SPLT data from the first 100 seconds of each flow.

$N_i$=number of neurons in the input layer of deep learning neural network 408.

With these parameters in mind, the SPLT information from the telemetry data can be projected onto to the input layer of deep learning neural network 408 in one of two ways, in various embodiments:

1.) With constant bin sizes:

In this case, the time window $T_w$ is divided into many equidistant small bins of size $T_w/N_i$ and the SPLT data is projected onto these bins. $T_w$ should be sufficiently large to cover as many packets as possible, considering SPLT configuration and flow timeouts), while the bin sizes should be as small as possible to cover sufficient SPLT variability. Each packet is distributed to the corresponding bin, based on timestamps equally, so the summation of all bins is equal to the summation of all SPLT lengths from the time window $T_w$.

For example, as shown, assume that $T_w=160$ ms and that $N_i=16$. In such a simplified case, each bin of histogram 502 may be of constant size (160 ms/16)=10 ms and mapping of the SPLT information to the histogram bins may proceed as shown below in Table 1:

TABLE 1

| Packet Number | Application Data Length | Timestamp for T array (milliseconds) | Arrival Time Since Flow Start (milliseconds) | Histogram Bin |
|---|---|---|---|---|
| 1 | 0 | — | 0 | 0 |
| 2 | 0 | — | 3 | 0 |
| 3 | 64 | 6 | 9 | 10 |
| 4 | 126 | 8 | 17 | 20 |
| 5 | 740 | 15 | 32 | 30 |
| 6 | 740 | 38 | 70 | 70 |
| 7 | 300 | 25 | 95 | 100 |
| 8 | 300 | 17 | 112 | 110 |
| 9 | 300 | 5 | 117 | 120 |
| 10 | 320 | 41 | 158 | 160 |

Each of the histogram bins can then be used as a separate entry in input vector 504 for the input layer of deep learning neural network 408, which outputs the final SPLT encoding used for classification.

2.) With normalized bin sizes:

In a simpler embodiment, the projection of the SPLT information onto the input layer of deep learning neural network 408 may instead take into account only one parameter: the number of neurons in the input layer, $N_i$. In such a case, $T_w$ may instead span the entire SPLT time window and the size of each bin is $T_w/N_i$, which means that the bin size can vary from sample to sample. This type of projection is more resilient to time fluctuations and link capacity.

In either case, whether constant or normalized bin sizes are used, the SPLT information for a flow may be divided into a histogram having a number of bins equal to the number of neurons in the input layer of deep learning neural network 408.

Referring again to FIG. 4, training of deep learning neural network 408 may be achieved by flow sampler 404 randomly sampling two examples $x_a^{(m)}$, $x_b^{(m)}$ from the same class m from clustering module 402. For example, flow sampler 404 may select two example flows from the observed or malware-related flow cluster belonging to class m. If the two examples were selected from an observed flow cluster, flow sampler 404 may sample an additional flow example $x_c^{(n)}$ from a corresponding malware-related flow cluster. Conversely, if the two randomly selected examples were from a malware-related flow cluster, flow sampler 404 may sample the additional flow example from an observed flow cluster. Of course, other numbers of samples can be used for purposes of training, as desired.

In various embodiments, training module 406 may project the three examples onto the input layer of deep learning neural network 408 using one of the histogram-based binning approaches, described previously. By doing so, deep learning neural network 408 may compute the following SPLT information encodings: $f(x_a^{(m)})$, $f(x_b^{(m)})$, $f(x_{ca}^{(n)})$. Using those, training module 406 may then attempt to optimize the parameters of deep learning neural network 408 to satisfy: $\|f(x_a^{(m)})-f(x_b^{(m)})\|^2+\text{alpha}\leq\|f(x_a^{(m)})-f(x_c^{(n)})\|^2$, which adjusts deep learning neural network 408 in such a way that two samples from the same class should be more similar than two samples from different classes.

Once training module 406 has trained deep learning neural network 408, traffic analysis process 248 may detect malicious traffic flows by computing the distance of the encodings of traffic flows under scrutiny with the encodings from the testing set. Based on this, traffic analysis process 248 may output a flow classification 414 and/or initiate a mitigation action in the network, when it detects a malicious encrypted traffic flow. For example, if traffic analysis process 248 classifies the traffic flow of an endpoint as being malware-related, it may cause traffic associated with the endpoint to be blocked or redirect in the network and/or it may generate an alert for review by a security expert.

Figure 6:
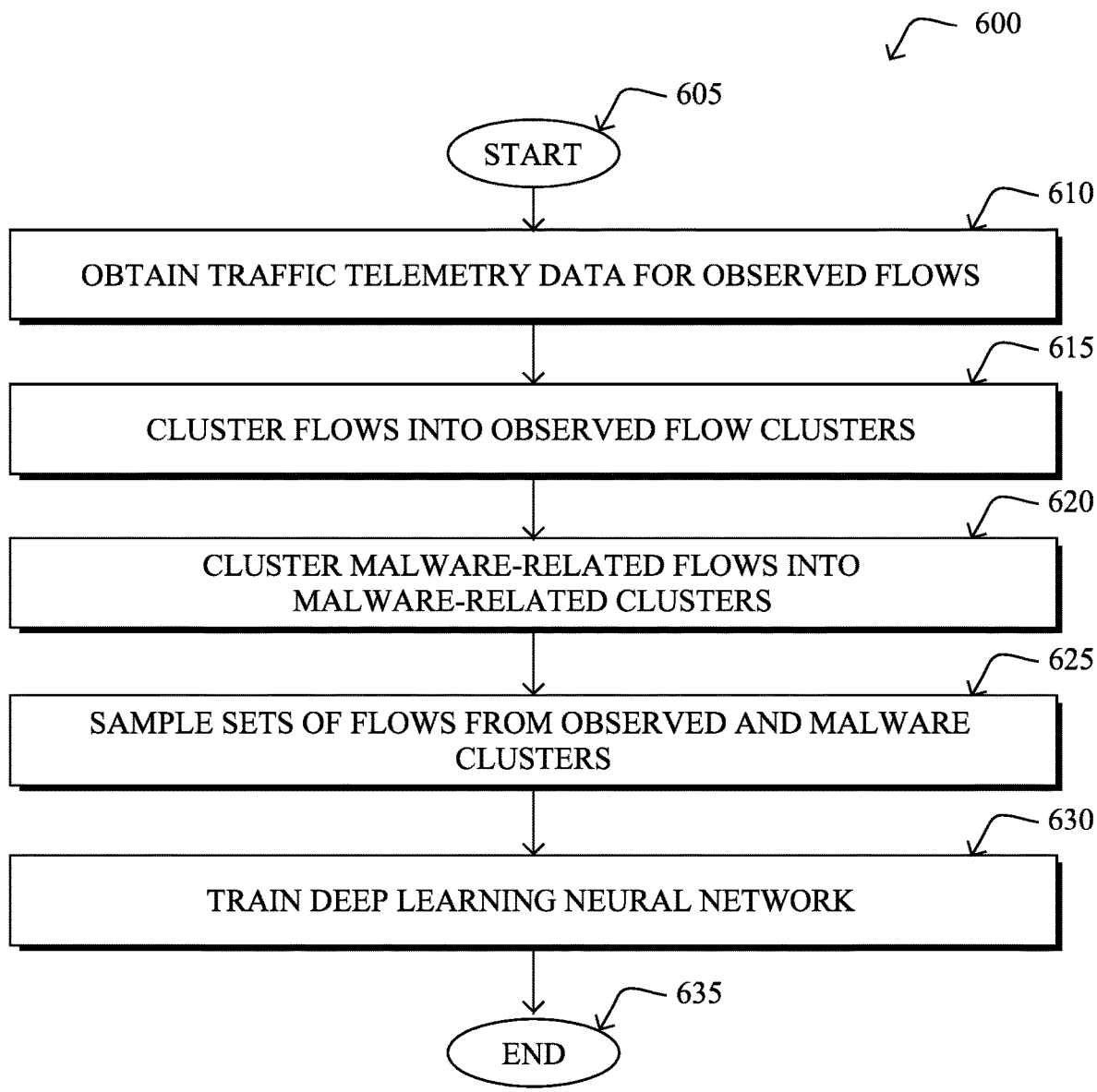
FIG. 6 illustrates an example simplified procedure for training a deep learning neural network to identify malware-related encrypted traffic flows.

FIG. 6 illustrates an example simplified procedure for training a deep learning neural network to identify malware-related encrypted traffic flows, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may obtain traffic telemetry data for a plurality of encrypted traffic flows observed in a network. In general, the traffic telemetry data may be indicative of sequence of packet lengths and times (SPLT) information for the observed traffic flows. The telemetry data may also indicate other packet and/or flow information such as the encryption protocol in use (e.g., a version of TLS, etc.), user-agent information, the server IP address, SNI information, the autonomous system involved, a server port, etc.

At step 615, as detailed above, the device may cluster the encrypted traffic flows into observed flow clusters, based on one or more flow-level features of the obtained traffic telemetry data. For example, the device may apply an unsupervised learning mechanism to the traffic telemetry data of step 610, to cluster the observed traffic flows based on their server IP addresses, SNI information, and/or any other flow-level features.

At step 620, the device may also cluster malware-related traffic telemetry data for encrypted traffic flows known to be malware-related into malware-related flow clusters, as described in greater detail above. Similar to step 615, the device may do so based on the one or more flow-level features used to cluster the observed traffic flows. Also similar to the observed flows from the network, the malware-related traffic telemetry data may include at least SPLT information for the malicious flows.

At step 625, as detailed above, the device may sample sets of traffic flows from the observed flow clusters and from the malware-related flow clusters. In general, each set of traffic flows may include at least one traffic flow from an observed flow cluster and at least one traffic flow from a malware-related flow cluster. Preferably, the selection may entail selecting two examples of one type and one example of the other, although the techniques are not limited to this approach.

At step 630, the device may train a deep learning neural network to determine whether a particular encrypted traffic flow is malware-related, as described in greater detail above. Notably, the device may use the SPLT information for the sampled sets of traffic flows as input to an input layer of neurons of the deep learning neural network. For example, the device may project the SPLT information for the sampled sets into a number of bins equal to the number of neurons in the input layer of the deep learning neural network. This may be done either on a fixed bin size basis (e.g., by dividing the time window for the SPLT information by the number of input neurons) or on a normalized basis.

In turn, the device may optimize one or more parameters of the deep learning neural network such that two samples from the same class of traffic flows are more similar than two samples from different classes of traffic flows. Once trained, the device may use the trained deep learning neural network to classify a particular traffic flow and, if that flow is deemed malware-related, initiate a mitigation action in the network in which the flow was observed. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of malware-related traffic flow, even when those flows are encrypted, and without requiring decryption of the flows. In contrast to prior approaches, no hand-made features are required, as the techniques herein work with raw SPLT data. In addition, only limited labeled data is needed by the techniques herein, requiring only a few examples per malicious class. Further, the techniques herein are able to leverage large amounts of unlabeled examples, to train a deep learning neural network for purposes of flow classification and malware identification.

While there have been shown and described illustrative embodiments that provide for detecting encrypted malware with SPLT-based deep networks, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a device, traffic telemetry data for a plurality of encrypted traffic flows observed in a network, wherein the traffic telemetry data is indicative of sequence of packet lengths and times (SPLT) information for the observed plurality of encrypted traffic flows;
clustering, by the device, the observed plurality of encrypted traffic flows into observed encrypted flow clusters, based on one or more flow-level features of the obtained traffic telemetry data;
clustering, by the device and based on the one or more flow-level features, malware-related traffic telemetry data for malware-related encrypted traffic flows known to be malware-related into malware-related encrypted flow clusters, wherein the malware-related traffic telemetry data is indicative of SPLT information for the malware-related encrypted traffic flows;
sampling, by the device, sets of encrypted traffic flows from the observed encrypted flow clusters and from the malware-related encrypted flow clusters, wherein each set of encrypted traffic flows includes at least one encrypted traffic flow from the observed encrypted flow clusters and at least one encrypted traffic flow from the malware-related encrypted flow clusters;
training, by the device, a deep learning neural network classifier to classify a particular encrypted traffic flow by using the SPLT information for the sampled sets of encrypted traffic flows as input to an input layer of neurons of the deep learning neural network classifier; and
after the clustering of the observed plurality of encrypted traffic flows into the observed encrypted flow clusters and the clustering of the malware-related traffic telemetry data into the malware-related encrypted flow clusters, causing, by the device, the trained deep learning neural network classifier to be used to classify the particular encrypted traffic flow.

2. The method as in claim 1, wherein the causing of the trained deep learning neural network classifier to be used to classify the particular encrypted traffic flow comprises:
using the trained deep learning neural network classifier to determine whether the particular encrypted traffic flow is malware-related; and
initiating a mitigation action in the network, when the particular encrypted traffic flow is determined to be malware-related.

3. The method as in claim 1, wherein the plurality of encrypted traffic flows are encrypted using Transport Layer Security (TLS).

4. The method as in claim 1, wherein training the deep learning neural network classifier to classify a particular encrypted traffic flow by using the SPLT information for the sampled sets of encrypted traffic flows as input to the input layer of neurons of the deep learning neural network classifier, comprises:
projecting the SPLT information for the sampled sets into a number of bins equal to the number of neurons in the input layer of the deep learning neural network classifier.

5. The method as in claim 4, wherein projecting the SPLT information for the sampled sets into a number of bins equal to the number of neurons in the input layer of the deep learning neural network classifier comprises:
associating the bins with time windows; and
projecting the SPLT information for the sampled sets from each of the time windows with their corresponding bins, based on the time windows associated with the bins.

6. The method as in claim 1, wherein each of the malware-related encrypted flow clusters has an associated observed encrypted flow cluster as part of a class of encrypted traffic flows, based on their flow-level features.

7. The method as in claim 6, wherein training the deep learning neural network classifier to classify a particular encrypted traffic flow comprises: optimizing one or more parameters of the deep learning neural network classifier such that two samples from the same class of encrypted traffic flows are more similar than two samples from different classes of encrypted traffic flows.

8. The method as in claim 6, wherein each of the malware-related encrypted flow clusters comprises a lesser number of flows than its associated observed encrypted flow cluster.

9. The method as in claim 1, wherein the one or more flow-level features comprise at least one of: a Server Name Indication (SNI), server Internet Protocol (IP) address, or autonomous system.

10. An apparatus, comprising:
one or more network interfaces to communicate with a network;
a processor coupled to the one or more network interfaces and configured to execute one or more processes; and
a memory configured to store a process executable by the processor, the process when executed configured to:
obtain traffic telemetry data for a plurality of encrypted traffic flows observed in a network, wherein the traffic telemetry data is indicative of sequence of packet lengths and times (SPLT) information for the observed plurality of encrypted traffic flows;
cluster the observed plurality of encrypted traffic flows into observed encrypted flow clusters, based on one or more flow-level features of the obtained traffic telemetry data;
cluster, based on the one or more flow-level features, malware-related traffic telemetry data for malware-related encrypted traffic flows known to be malware-related into malware-related encrypted flow clusters, wherein the malware-related traffic telemetry data is indicative of SPLT information for the malware-related encrypted traffic flows;
sample sets of encrypted traffic flows from the observed encrypted flow clusters and from the malware-related encrypted flow clusters, wherein each set of encrypted traffic flows includes at least one encrypted traffic flow from the observed encrypted flow clusters and at least one encrypted traffic flow from the malware-related encrypted flow clusters;
train a deep learning neural network classifier to classify a particular encrypted traffic flow by using the SPLT information for the sampled sets of encrypted traffic flows as input to an input layer of neurons of the deep learning neural network classifier; and
after the clustering of the observed plurality of encrypted traffic flows into the observed encrypted flow clusters and the clustering of the malware-related traffic telemetry data into the malware-related encrypted flow clusters, cause the trained deep learning neural network classifier to be used to classify the particular encrypted traffic flow.

11. The apparatus as in claim 10, wherein the apparatus causes the trained deep learning neural network classifier to be used to classify the particular encrypted traffic flow by:
using the trained deep learning neural network classifier to determine whether the particular encrypted traffic flow is malware-related; and
initiating a mitigation action in the network, when the particular encrypted traffic flow is determined to be malware-related.

12. The apparatus as in claim 10, wherein the plurality of encrypted traffic flows are encrypted using Transport Layer Security (TLS).

13. The apparatus as in claim 10, wherein the apparatus trains the deep learning neural network classifier to classify a particular encrypted traffic flow by using the SPLT information for the sampled sets of encrypted traffic flows as input to the input layer of neurons of the deep learning neural network classifier, by:
projecting the SPLT information for the sampled sets into a number of bins equal to the number of neurons in the input layer of the deep learning neural network classifier.

14. The apparatus as in claim 13, wherein the apparatus projects the SPLT information for the sampled sets into a number of bins equal to the number of neurons in the input layer of the deep learning neural network classifier by:
associating the bins with time windows; and
projecting the SPLT information for the sampled sets from each of the time windows with their corresponding bins, based on the time windows associated with the bins.

15. The apparatus as in claim 10, wherein each of the malware-related encrypted flow clusters has an associated observed encrypted flow cluster as part of a class of encrypted traffic flows, based on their flow-level features.

16. The apparatus as in claim 15, wherein the apparatus trains the deep learning neural network classifier to classify a particular encrypted traffic flow by: optimizing one or more parameters of the deep learning neural network classifier such that two samples from the same class of encrypted traffic flows are more similar than two samples from different classes of encrypted traffic flows.

17. The apparatus as in claim 16, wherein each of the malware-related encrypted flow clusters comprises a lesser number of flows than its associated observed encrypted flow cluster.

18. The apparatus as in claim 10, wherein the one or more flow-level features comprise at least one of: a Server Name Indication (SNI), server Internet Protocol (IP) address, or autonomous system.

19. A tangible, non-transitory, computer-readable medium storing program instructions that cause a device to execute a process comprising:
obtaining, by the device, traffic telemetry data for a plurality of encrypted traffic flows observed in a network, wherein the traffic telemetry data is indicative of sequence of packet lengths and times (SPLT) information for the observed plurality of encrypted traffic flows;
clustering, by the device, the observed plurality of encrypted traffic flows into observed encrypted flow clusters, based on one or more flow-level features of the obtained traffic telemetry data;
clustering, by the device and based on the one or more flow-level features, malware-related traffic telemetry data for malware-related encrypted traffic flows known to be malware-related into malware-related encrypted flow clusters, wherein the malware-related traffic telemetry data is indicative of SPLT information for the malware-related encrypted traffic flows;
sampling, by the device, sets of encrypted traffic flows from the observed encrypted flow clusters and from the malware-related encrypted flow clusters, wherein each set of encrypted traffic flows includes at least one encrypted traffic flow from the observed encrypted flow clusters and at least one encrypted traffic flow from the malware-related encrypted flow clusters;
training, by the device, a deep learning neural network classifier to classify a particular encrypted traffic flow by using the SPLT information for the sampled sets of encrypted traffic flows as input to an input layer of neurons of the deep learning neural network classifier; and after the clustering of the observed plurality of encrypted traffic flows into the observed encrypted flow clusters and the clustering of the malware-related traffic telemetry data into the malware-related encrypted flow clusters, causing, by the device, the trained deep learning neural network classifier to be used to classify the particular encrypted traffic flow.

20. The computer-readable medium as in claim 19, wherein training the deep learning neural network classifier to classify a particular encrypted traffic flow by using the SPLT information for the sampled sets of encrypted traffic flows as input to the input layer of neurons of the deep learning neural network classifier, comprises:

projecting the SPLT information for the sampled sets into a number of bins equal to the number of neurons in the input layer of the deep learning neural network classifier.

* * * * *

UNITED STATES PATENT AND TRADEMARK OFFICE
CERTIFICATE OF CORRECTION

PATENT NO. : 11,201,877 B2
APPLICATION NO. : 16/216361
DATED : December 14, 2021
INVENTOR(S) : Karel Bartos Page 1 of 1

It is certified that error appears in the above-identified patent and that said Letters Patent is hereby corrected as shown below:

In the Specification

Column 11, Line 61, please amend as shown:
SPLT information encodings: $f(x_a^{(m)})$, $f(x_b^{(m)})$, $f(x_c^{(n)})$ Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*